(12) United States Patent
Akahane et al.

(10) Patent No.: US 8,403,377 B2
(45) Date of Patent: Mar. 26, 2013

(54) CAB FRONT WINDOW LOCKING DEVICE

(75) Inventors: Eiji Akahane, Kako-gun (JP); Teruyuki Yamada, Kako-gun (JP); Tomoya Hirano, Onomichi (JP); Yusuke Harayama, Onomichi (JP)

(73) Assignee: Caterpillar Japan Ltd., Tokyo (JP)

( * ) Notice: Subject to any disclaimer, the term of this patent is extended or adjusted under 35 U.S.C. 154(b) by 477 days.

(21) Appl. No.: 12/451,567

(22) PCT Filed: Feb. 18, 2008

(86) PCT No.: PCT/JP2008/000244
§ 371 (c)(1),
(2), (4) Date: Nov. 19, 2009

(87) PCT Pub. No.: WO2008/142819
PCT Pub. Date: Nov. 27, 2008

(65) Prior Publication Data
US 2010/0127513 A1    May 27, 2010

(30) Foreign Application Priority Data
May 21, 2007    (JP) ................... 2007-134106

(51) Int. Cl.
*E05C 3/02* (2006.01)
*E05C 3/06* (2006.01)
*E05C 0/12* (2006.01)
*E05C 3/14* (2006.01)
*E05C 19/10* (2006.01)

(52) U.S. Cl. ........ 292/194; 292/214; 292/219; 292/228; 292/95

(58) Field of Classification Search ................ 292/194, 292/214, 215, 216, 228, 95, 113, 102, DIG. 6, 292/DIG. 20
See application file for complete search history.

(56) References Cited

U.S. PATENT DOCUMENTS 1,580,666 A * 4/1926 Hansen .................... 292/128
3,905,626 A * 9/1975 Myers ...................... 292/216
4,174,129 A * 11/1979 Schwandt et al. ......... 292/216
(Continued)

FOREIGN PATENT DOCUMENTS

JP    A-2000-291323    10/2000
JP    A-2002-88814    3/2002
(Continued)

OTHER PUBLICATIONS

International Search Report for International Application No. PCT/JP2008/000244, issued on Mar. 18, 2008.

*Primary Examiner* — Thomas Beach
*Assistant Examiner* — Nathan Cumar
(74) *Attorney, Agent, or Firm* — Oliff & Berridge, PLC

(57) ABSTRACT

A locking device includes a lock body that includes an engagement groove with or from which the closing-side and opening-side lock receivers are engaged or disengaged, the lock body being variable between a neutral posture in which the closing-side and opening-side lock receivers are allowed to be engaged with or disengaged from the engagement groove; a closing-side locking posture in which the closing-side lock receiver that is engaged with the engagement groove is regulated so as not to be disengaged from the engagement groove; or an opening-side locking posture in which the opening-side lock receiver that is engaged with the engagement groove is regulated so as not to be disengaged from the engagement groove; a holding member and a release operation lever.

14 Claims, 14 Drawing Sheets

U.S. PATENT DOCUMENTS

| | | | |
|---|---|---|---|
| 4,950,006 A * | 8/1990 | Lambke | 292/216 |
| 5,028,082 A * | 7/1991 | Kronbetter | 292/128 |
| 5,096,253 A * | 3/1992 | Jo et al. | 296/190.1 |
| 5,655,798 A * | 8/1997 | Kaveney et al. | 292/3 |
| 5,873,612 A * | 2/1999 | Connor | 292/338 |
| 6,474,705 B1 | 11/2002 | Mori et al. | |
| 7,344,169 B2 * | 3/2008 | Han | 292/340 |
| 2003/0025338 A1 * | 2/2003 | Mori et al. | 292/196 |

FOREIGN PATENT DOCUMENTS

| | | |
|---|---|---|
| JP | B2-3386821 | 1/2003 |
| JP | A-2003-237365 | 8/2003 |

* cited by examiner ion No. JP-B2-3386821, for example). This configuration
CAB FRONT WINDOW LOCKING DEVICE

CROSS-REFERENCE TO RELATED APPLICATION

This application is the U.S. National Phase of PCT/JP2008/000244, filed Feb. 18, 2008, which claims priority from Japanese Patent Application No. 2007-134106, filed May 21, 2007, the entire disclosure of which is incorporated herein by reference hereto.

BACKGROUND

The present disclosure relates to a locking device.

There exists a front window that is mounted on a cab of a construction machine or the like. The front window is movable between a closed position in which a window opening part of a cab front face is closed, and an opened position in which the window opening part is opened while the front window is housed into a roof-ceiling portion of the cab. It is necessary to lock the front window at the closed position for security reasons when the construction machine is not in use and at the opened position to prevent the front window from falling when the front window is opened.

A right and left locking device is mounted on a right and left side of the front window in order to lock the front window at the closed position or the opened position (see Japanese Published Unexamined Patent Application No. JP-A-2002-88814, for example). This conventional configuration requires a pair of right and left window-closing-side and window-opening-side hooks and window-closing-side and window-opening-side engagement pins because the right and left window-closing-side and window-opening-side hooks of the right and left locking devices are respectively engaged with the right and left window-closing-side and window-opening-side engagement pins that are provided at a side of the cab. Further, this configuration requires a connection member (lock release bar) that connects the right and left locking devices because a release lever is used to release a locking of each of the right and left locking devices, with a resultant larger number of parts. Further, this configuration entails a difficult adjustment and time consuming work because a right and left engagement needs to be adjusted in position simultaneously between the window-closing-side hooks and the window-closing-side engagement pins, and the window-opening-side hooks and the window-open-side engagement pins.

There exists another configuration that includes a closing lock device that locks the front window at the closed position; and an opening lock device that locks the front window at the opened position. The closing lock device includes a closing latch mechanism that is provided at a horizontal center of the front window; and a striker that is provided at the cab side. The opening lock device includes a striker that is provided at a side of the front window; and an opening latch mechanism that is provided at the cab side (see Japanese Patent Registration No. JP-B2-3386821, for example). This configuration does not require pairs of right and left parts or such a time consuming positional adjustment for the right and left simultaneous engagement to provide an engagement between the closing and opening latch mechanisms and the strikers, with a resultant easier adjustment.

SUMMARY

Nevertheless, the above-mentioned configuration requires the latch mechanism for the closing and opening, respectively. Further, a release lever is used to release a locking of the closing latch mechanism at the front window side and the opening latch mechanism at the cab side. A large number of additional parts are thus necessary, such as a link to connect the release lever and the opening latch mechanism. Further, operability of the release lever is prone to be degraded because the release lever requires an operation through such multiple parts. The present disclosure intends to solve the problems, and achieve other advantages.

The present disclosure has been made for the purpose of solving the above-described problems in view of the circumstances above. A first exemplary aspect of the present disclosure provides a locking device that locks a cab front window of a cab at a closed position or at an opened position, the front window being movable between the closed position in which the front window closes a window opening part of a front face of the cab and the opened position in which the front window opens the window opening part while being housed into a roof-ceiling portion of the cab. The locking device includes a locking mechanism that is provided at a side of the front window; and closing-side and opening-side lock receivers that are provided at a side of the cab, the closing-side and opening-side lock receivers being engageable with the locking mechanism of the front window that is positioned at either the closed position or the opened position. The locking mechanism includes a lock body that includes an engagement groove with or from which the closing-side and opening-side lock receivers are engaged or disengaged, the lock body being variable between a neutral posture in which the closing-side and opening-side lock receivers are allowed to be engaged with or disengaged from the engagement groove; a closing-side locking posture in which the closing-side lock receiver that is engaged with the engagement groove is regulated so as not to be disengaged from the engagement groove; or an opening-side locking posture in which the opening-side lock receiver that is engaged with the engagement groove is regulated so as not to be disengaged from the engagement groove; a holding member that maintains the lock body in the closing-side or opening-side locking posture; and a release operation lever that acts on the holding member so as to release the closing-side or opening-side locking posture of the lock body that is maintained by the holding member.

A second exemplary aspect of the present disclosure provides the cab front window locking device according to the first exemplary aspect that includes a second locking device that double-locks the front window at the opened position. The second locking device includes a second lock body that is provided at the front window side; and a second opening-side lock receiver that is provided at the cab side, the second opening-side lock receiver being latchable with the second lock body of the front window that is positioned at the opened position. The second lock body is variable between a locking posture in which the second lock body is latched with the second opening-side lock receiver; or a releasing posture in which the second lock body is not latched with the second opening-side lock receiver. The release operation lever acts on the second lock body such that the second lock body changes into the releasing posture from the locking posture.

According to the first exemplary aspect, the locking mechanism can be used to lock the front window not only at the closed position but also at the opened positions. Components of the locking mechanism such as a lock body and a holding member do not need to be provided separately at each side of the closed and opened positions, with a resultant smaller number of parts, a reduced cost and a downsized locking mechanism. Further, in order to release the locked front window at the closed or opened position, the release operation lever is operated to release the holding of the holding member with respect to the lock body in the closing-side or opening-side locking posture. In this case, the release operation lever can directly act on the holding member because both of the release operation lever and the holding member are provided at the front window side. No additional member is necessary to connect the release operation lever and the holding member. The number of parts is left smaller. Operability of the release operation lever is also better.

According to the second exemplary aspect, the release operation lever that releases the locking of the locking device is also able to release the locking of the second locking device, with a resultant simplified releasing operation. Further, no additional member is necessary to connect the release operation lever and the second lock body, because the release operation lever is also able to operate directly on the second lock body, with a resultant smaller number of parts. The release operation lever can also be prevented from being degraded in operability.

BRIEF DESCRIPTION OF THE DRAWINGS

Various exemplary aspects will be described with reference to the drawings, wherein.

DETAILED DESCRIPTION OF EMBODIMENTS

Figure 1:
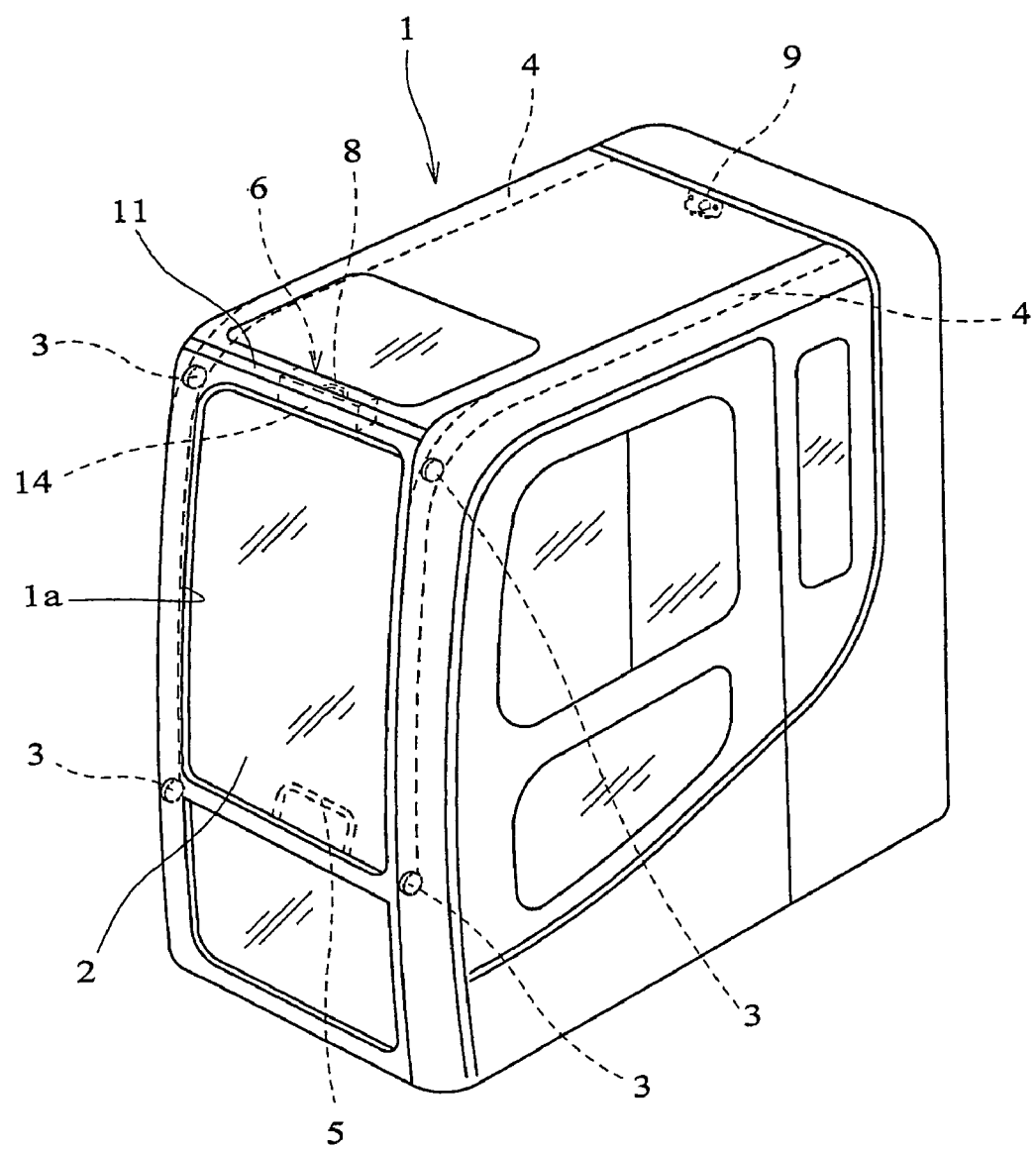
FIG. 1 is a schematic perspective view of a cab.
Figure 2:
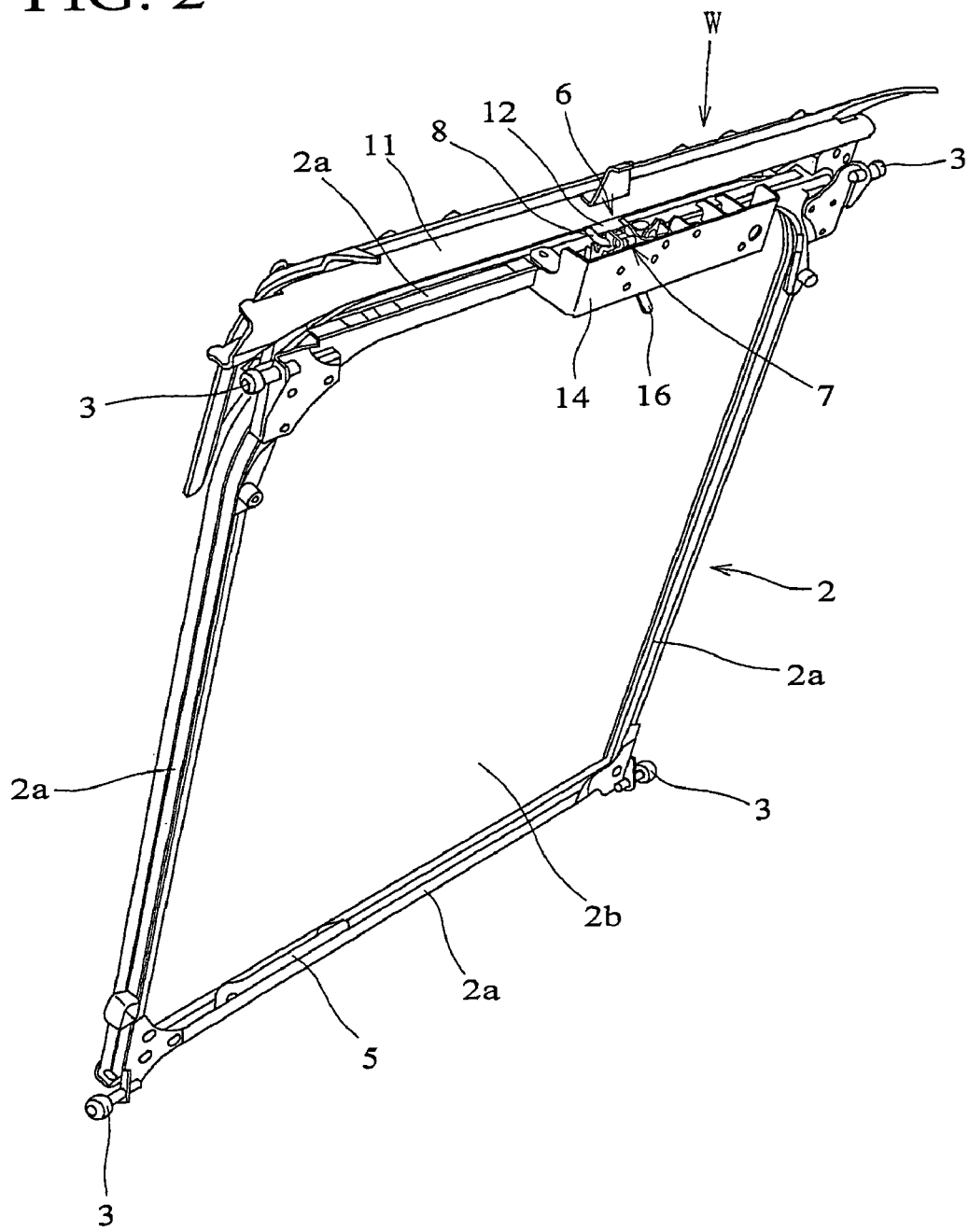
FIG. 2 is a perspective view of a front window that is locked at a closed position.
Figure 3:
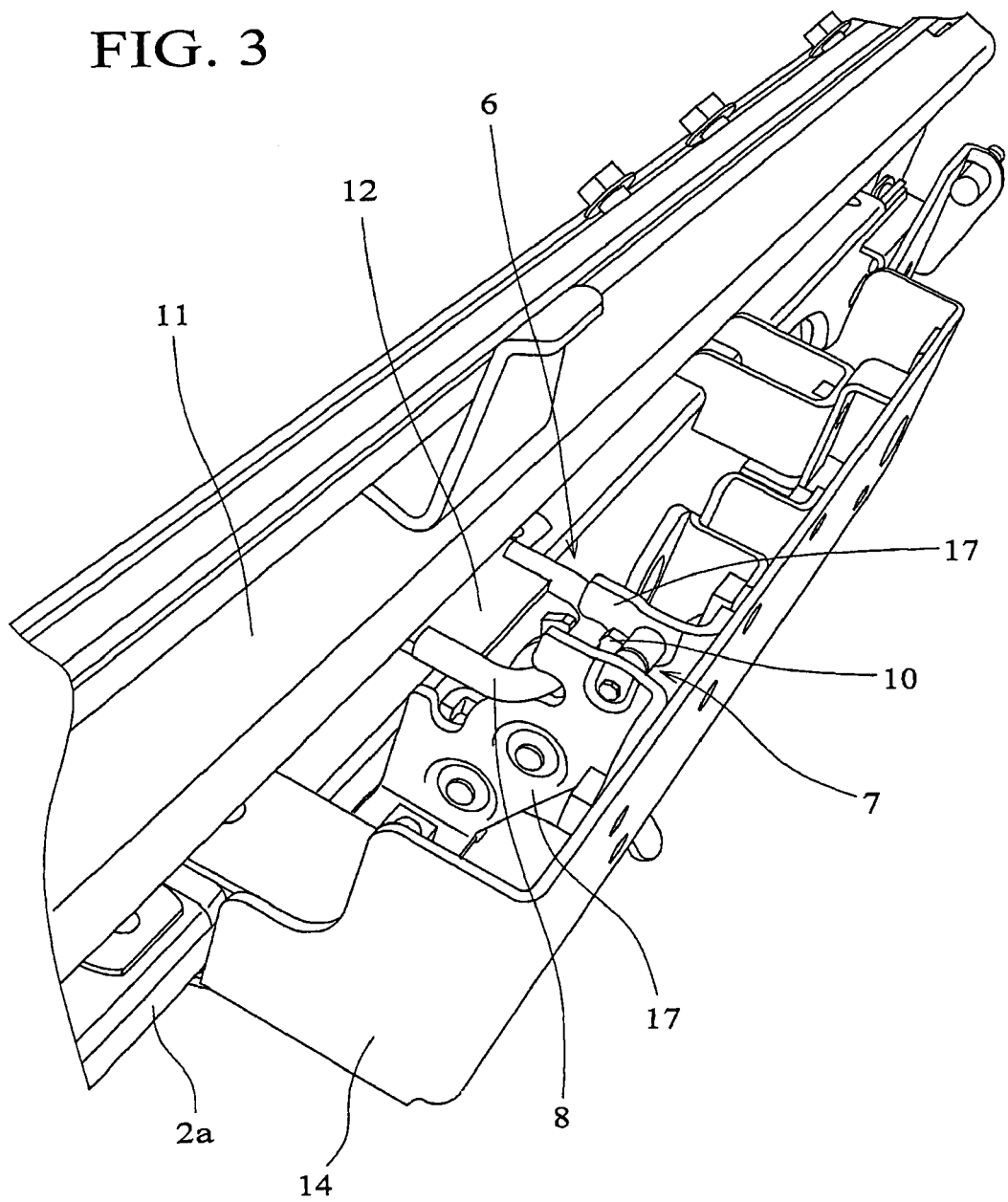
FIG. 3 is a view along an arrow W in FIG. 2.

An embodiment of the present disclosure will be described with reference to the accompanying drawings. A cab 1 is mounted on a construction machine such as a hydraulic shovel. A front face of the cab 1 has an open window opening portion 1a. A front window 2 includes left, right, top and bottom window frames 2a; and a transparent plate 2b such as a glass plate. The transparent plate 2b is assembled within the left, right, top and bottom window frames 2a. Installed at right and left end portions of the top and bottom window frames 2a, guide rollers 3 can roll and be guided along right and left inverted-L-shaped guide rails 4 that extends to a roof-ceiling portion from the front face of the cab 1. The guide rollers 3 being guided along the guide rails 4, the front window 2 can move between a closed position at which the front window 2 fully closes the window opening part 1a, and an opened position at which the front window 2 fully opens the window opening part 1a by being housed into the roof-ceiling portion of the cab 1. A grip 5 is installed to the window frame 2a to be gripped by an operator when the front window 2 is moved to be opened or closed.

A locking device 6 locks the front window 2 at the closed and opened positions and includes a locking mechanism 7 that is disposed at a side of the front window 2; and closing-side and opening-side lock receivers 8 and 9 that are respectively disposed at a side of the cab 1.

The closing-side lock receiver 8 has a U shape that protrudes toward a back of the cab 1 and is installed via a mounting bracket 12 to a front frame 11 that is provided laterally above the window opening part 1a. The closing-side lock receiver 8 is engaged with a lock body 10 that constitutes the locking mechanism 7 when the front window 2 is disposed at a closed position, which will be described hereinafter. The opening-side lock receiver 9 has a U shape that protrudes toward a front of the cab 1 and is installed via a mounting bracket 13 on a rear portion of the roof-ceiling portion of the cab 1. The opening-side lock receiver 9 is engaged with the lock body 10 when the front window 2 is disposed at an opened position.

The locking mechanism 7, which is installed to the front window 2, is disposed at an approximately lateral center of the top window frame 2a and housed into a case 14 with an open top. The locking mechanism 7 also includes members such as the lock body 10; a holding member 15; and a release operation lever 16.

The lock body 10 is swingably supported around a spindle 18 between a pair of right and left first brackets 17 that are fixed to the case 14. An engagement groove 10a is formed on a swinging leading end side of the lock body 10 and engageable with the closing-side and opening-side lock receivers 8 and 9. A latch receiving part 10b is disposed in a protruding manner at an opposite side of the engagement groove 10a across the spindle 18. The latch receiving part 10b is latchable with a latch protruding piece 15a of the holding member 15, which will be described hereinafter.

Figure 10:
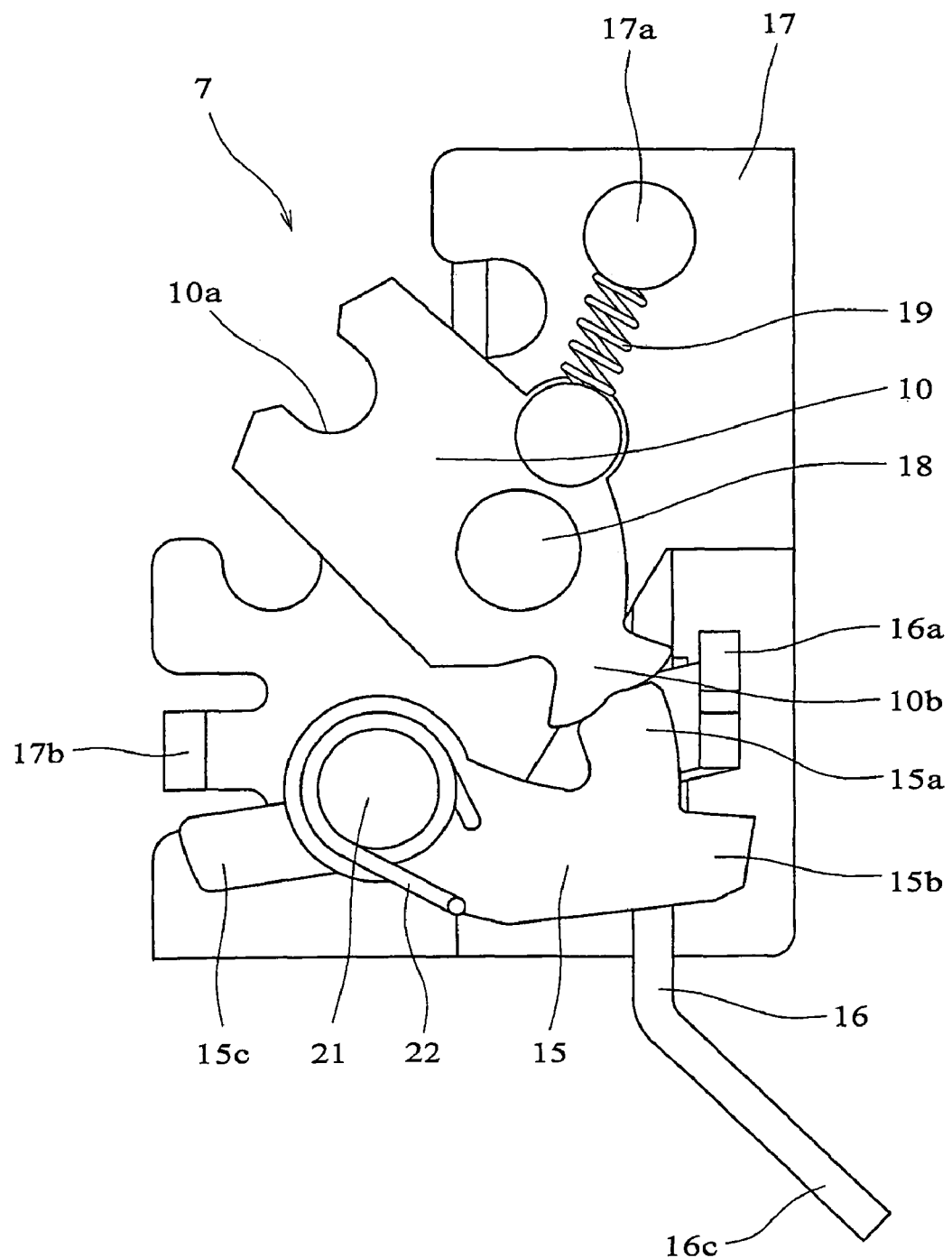
FIG. 10 is a view along arrows X-X in FIG. 9.
Figure 11X:
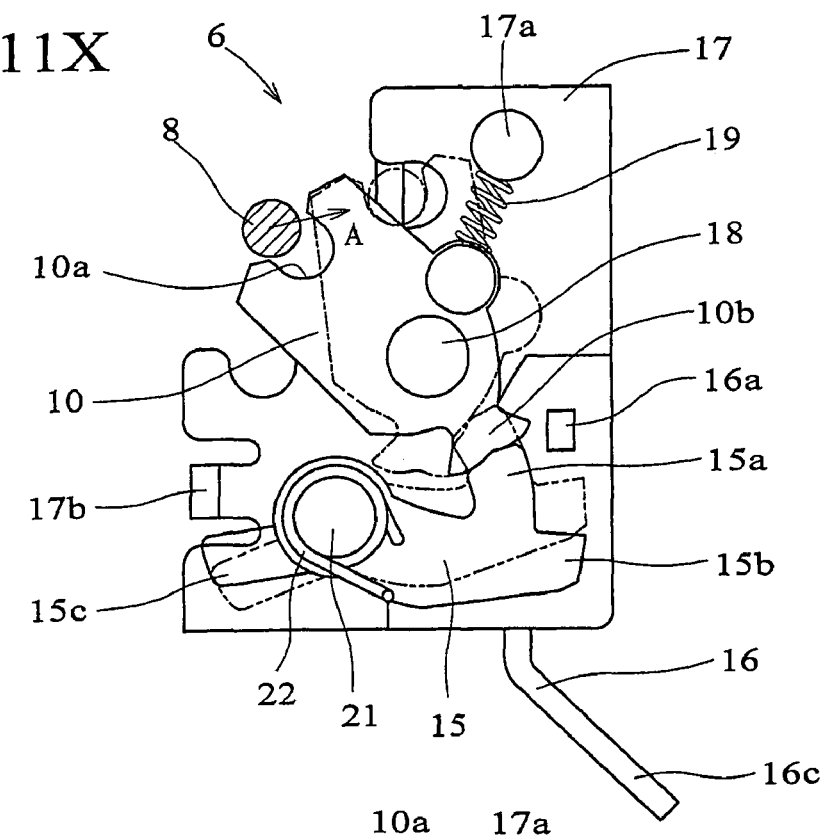
FIGS. 11X and 11Y show an operation of the locking device when the front window is positioned at a side of the closed position.
Figure 12X:
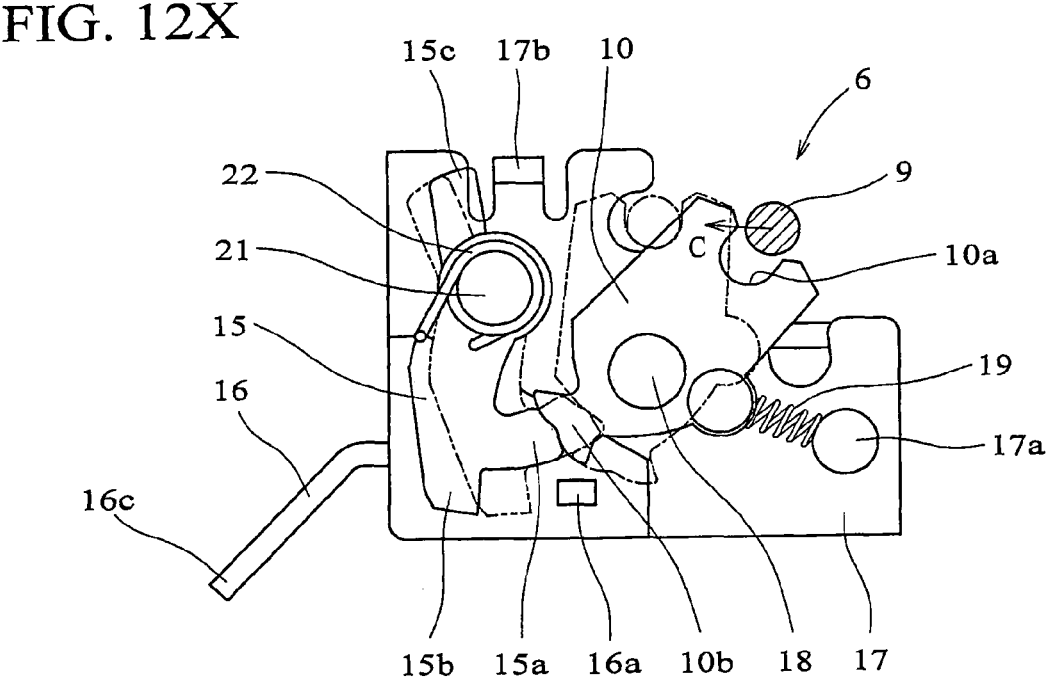
FIGS. 12 X and 12Y show an operation of the locking device when the front window is positioned at a side of the opened position.

Further, the lock body 10 is urged by a first spring 19 that is provided between the lock body 10 and a pin 17a that is supported between the right and left first brackets 17 so as to be a neutral posture as shown in FIG. 10. While the front window 2 moves to be opened or closed, the neutral posture of the lock body 10 is maintained where neither the closing-side lock receiver 8 nor the opening-side lock receiver 9 is engaged with the engagement groove 10a. In the neutral posture of the lock body 10, an opened side of the engagement groove 10a faces the closing-side or opening-side lock receiver 8 or 9 as shown in FIGS. 11X and 12X when the front window 2 is about to reach to the closed or opened position. This allows the closing-side or opening-side lock receiver 8 or 9 to be engaged with or disengaged from the engagement groove 10a.

When the front window 2 is about to reach to the closed position or opened position, the closing-side or opening-side lock receiver 8 or 9 is to be engaged with the engagement groove 10a of the lock body 10 in the neutral posture. When the front window 2 reaches the closed or opened position, the lock body 10 in the neutral posture swings to change into a closing-side or opening-side locking posture. Changes in swing phases will be described hereinafter with reference to FIGS. 11X, 11Y, 12X and 12Y.

When the closing-side lock receiver 8 is about to be engaged with the engagement groove 10a of the lock body 10 in a neutral posture as indicated by a solid line in FIG. 11X at a position where the front window 2 is about to reach to a closed position, a further movement of the front window 2 to a closed position causes the closing-side lock receiver 8 to relatively move in a direction as indicated by an arrow A in FIG. 11X with respect to the front window 2. Then, the lock body 10 swings clockwise around the spindle 18 into a closing-side locking posture as indicated by a solid line in FIG. 11Y as well as an alternate long and short dashed line in FIG. 11X. The closing-side locking posture of the lock body 10 is maintained by the holding member 15, which will be further described later, such that the closing-side lock receiver 8 does not relatively move in a direction in which the closing-side lock receiver 8 is disengaged from the engagement groove 10a as indicated by an arrow B in FIG. 11Y even if the front window 2 is made to move toward an opened position. Accordingly, the front window 2 is configured to be locked automatically by the locking device 6 when the front window 2 is positioned at the closed position.

When the opening-side lock receiver 9 is about to be engaged with the engagement groove 10a of the lock body 10 in a neutral posture as indicated by a solid line in FIG. 12X at a position where the front window 2 is about to reach an opened position, a further movement of the front window 2 to an opened position causes the opening-side lock receiver 9 to relatively move in a direction as indicated by an arrow C in FIG. 12X with respect to the front window 2. Then, the lock body 10 swings counterclockwise around the spindle 18 into an opening-side locking posture as indicated by a solid line in FIG. 12Y as well as an alternate long and short dashed line in FIG. 12X. The opening-side locking posture of the lock body 10 is maintained by the holding member 15, which will be further described later, such that the opening-side lock receiver 9 does not relatively move in a direction in which the opening-side lock receiver 9 is disengaged from the engagement groove 10a as indicated by an arrow D in FIG. 12Y even if the front window 2 is made to move toward an closed position. Accordingly, the front window 2 is configured to be locked automatically by the locking device 6 when the front window 2 is positioned at the opened position.

Figure 4:
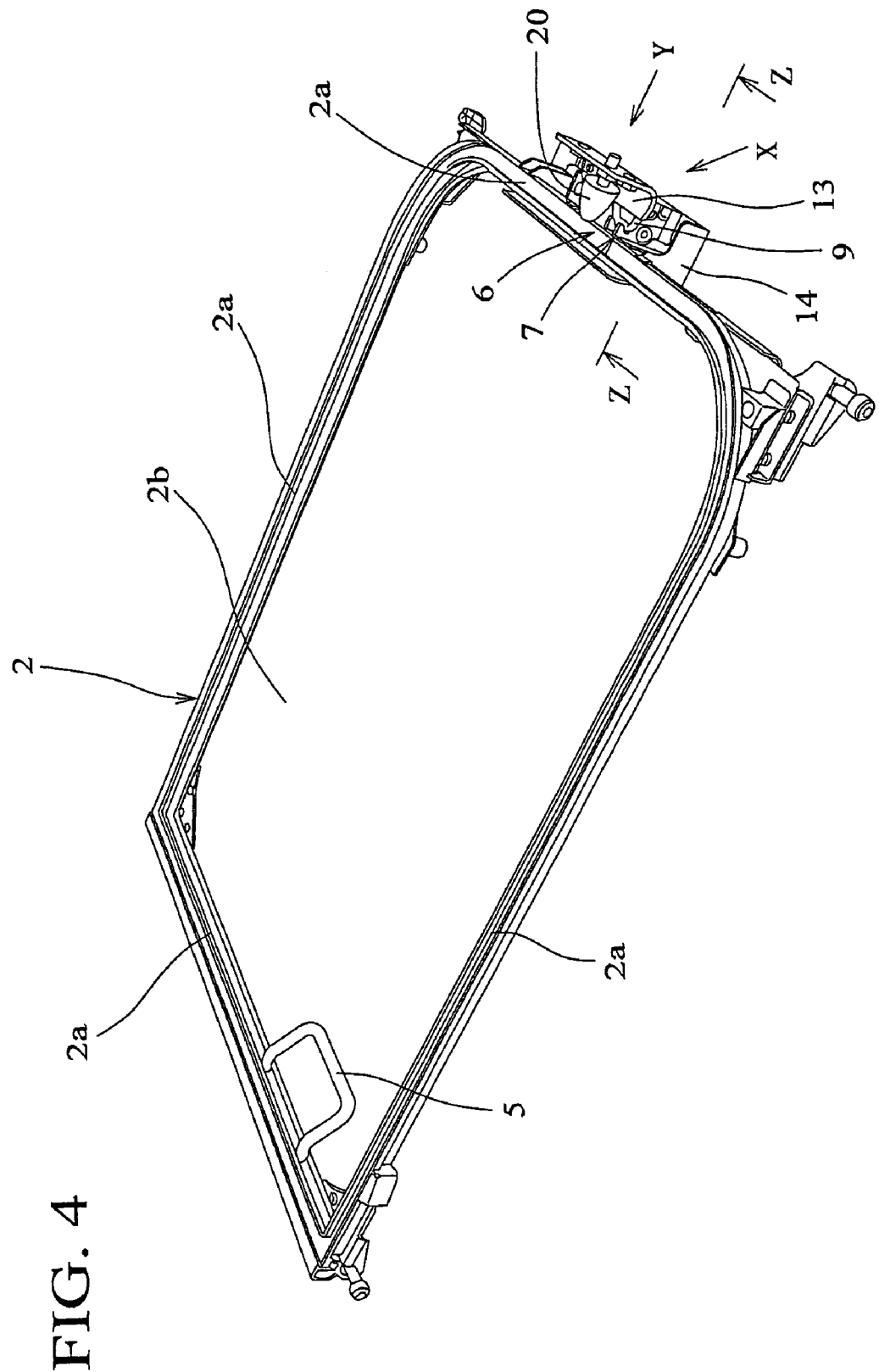
FIG. 4 is a perspective view of the front window that is locked at an opened position.
Figure 5:
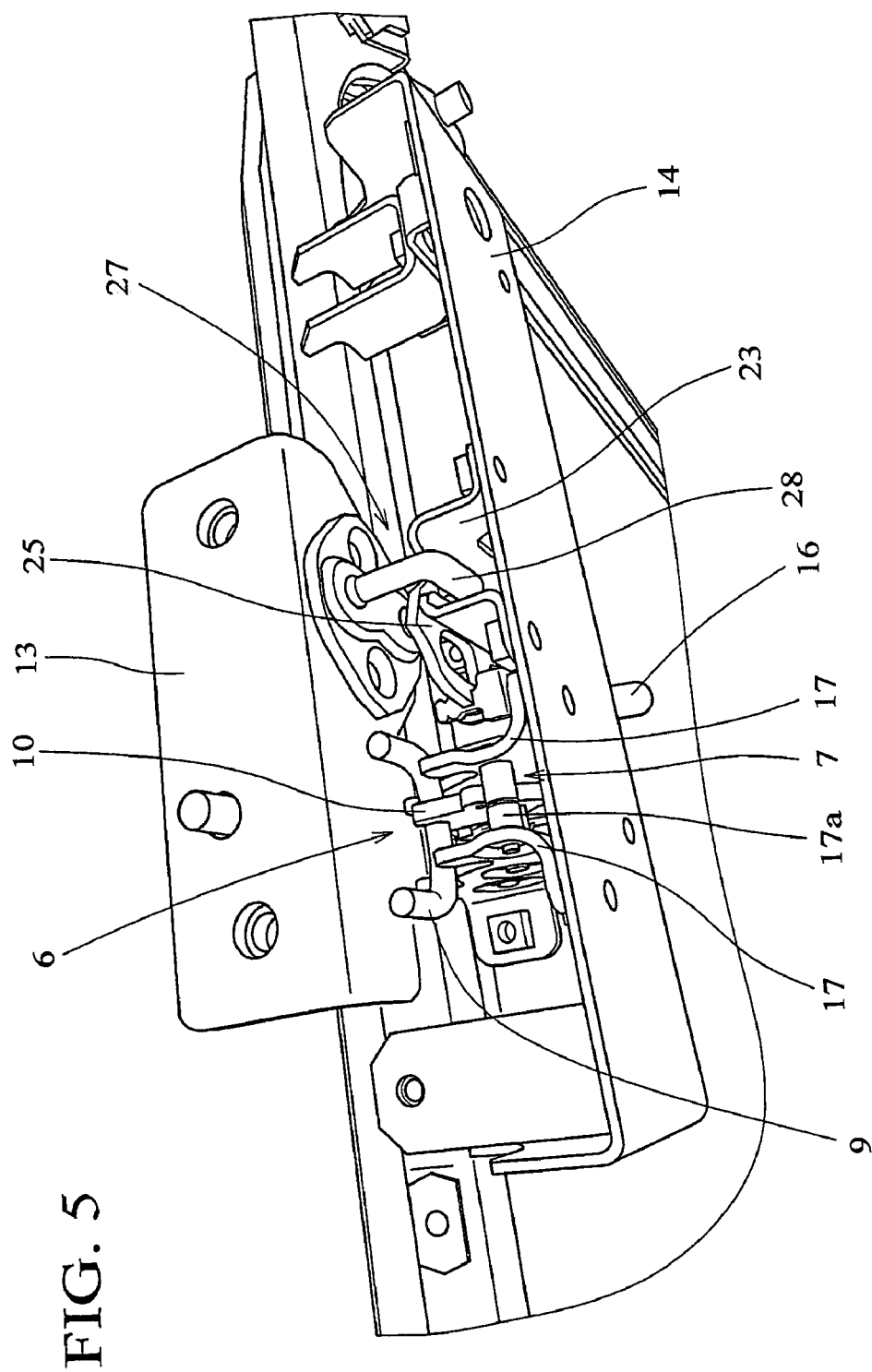
FIG. 5 is a view along an arrow X in FIG. 4.
Figure 6:
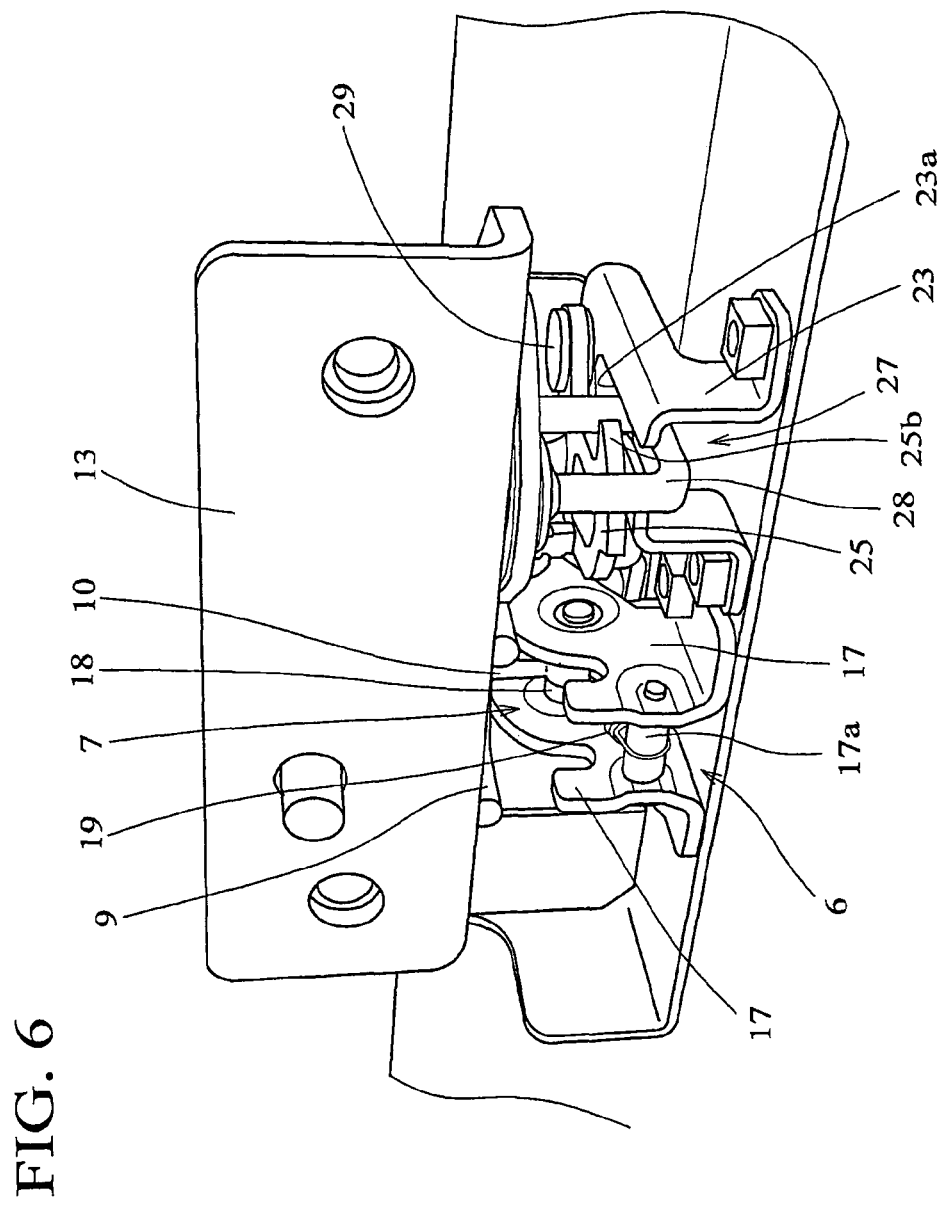
FIG. 6 is a view along an arrow Y in FIG. 4.
Figure 7:
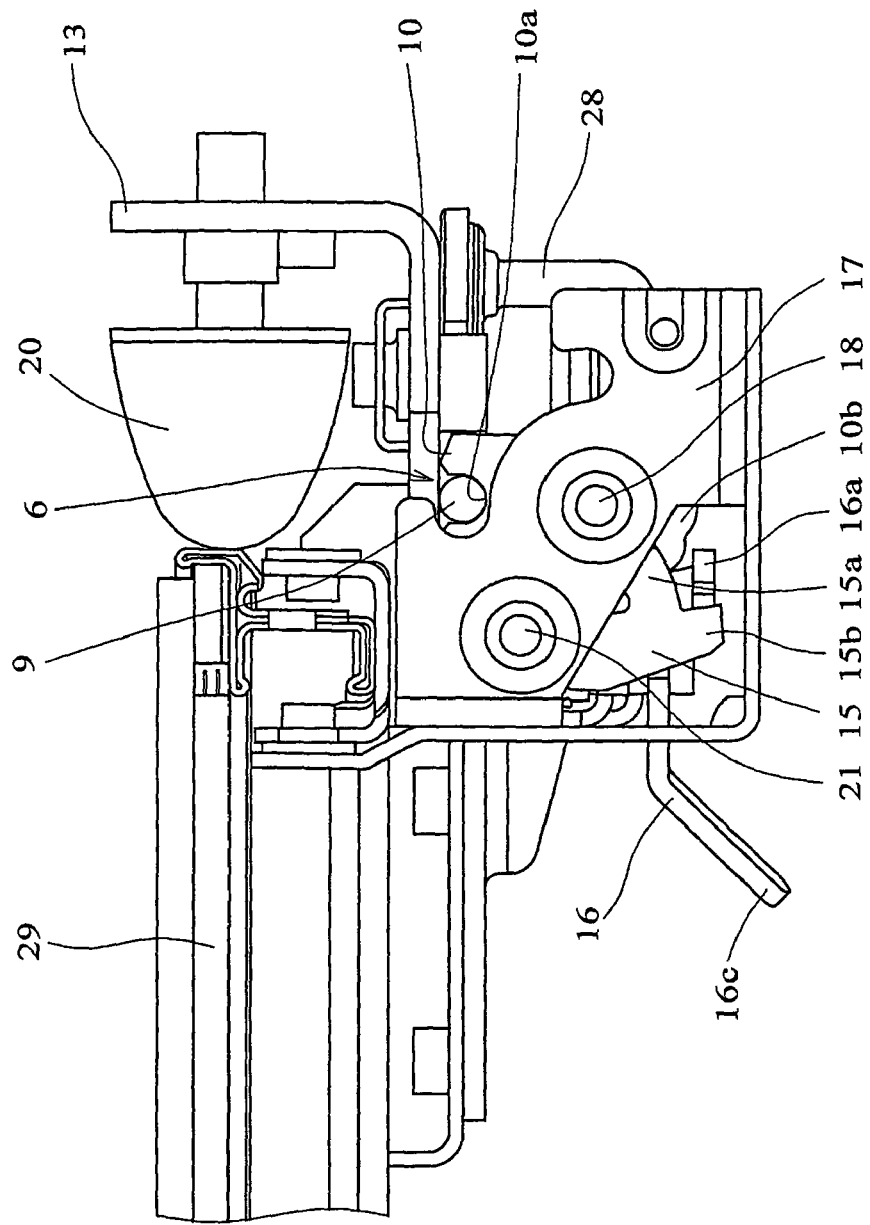
FIG. 7 is a view along arrows Z-Z in FIG. 4.
Figure 8:
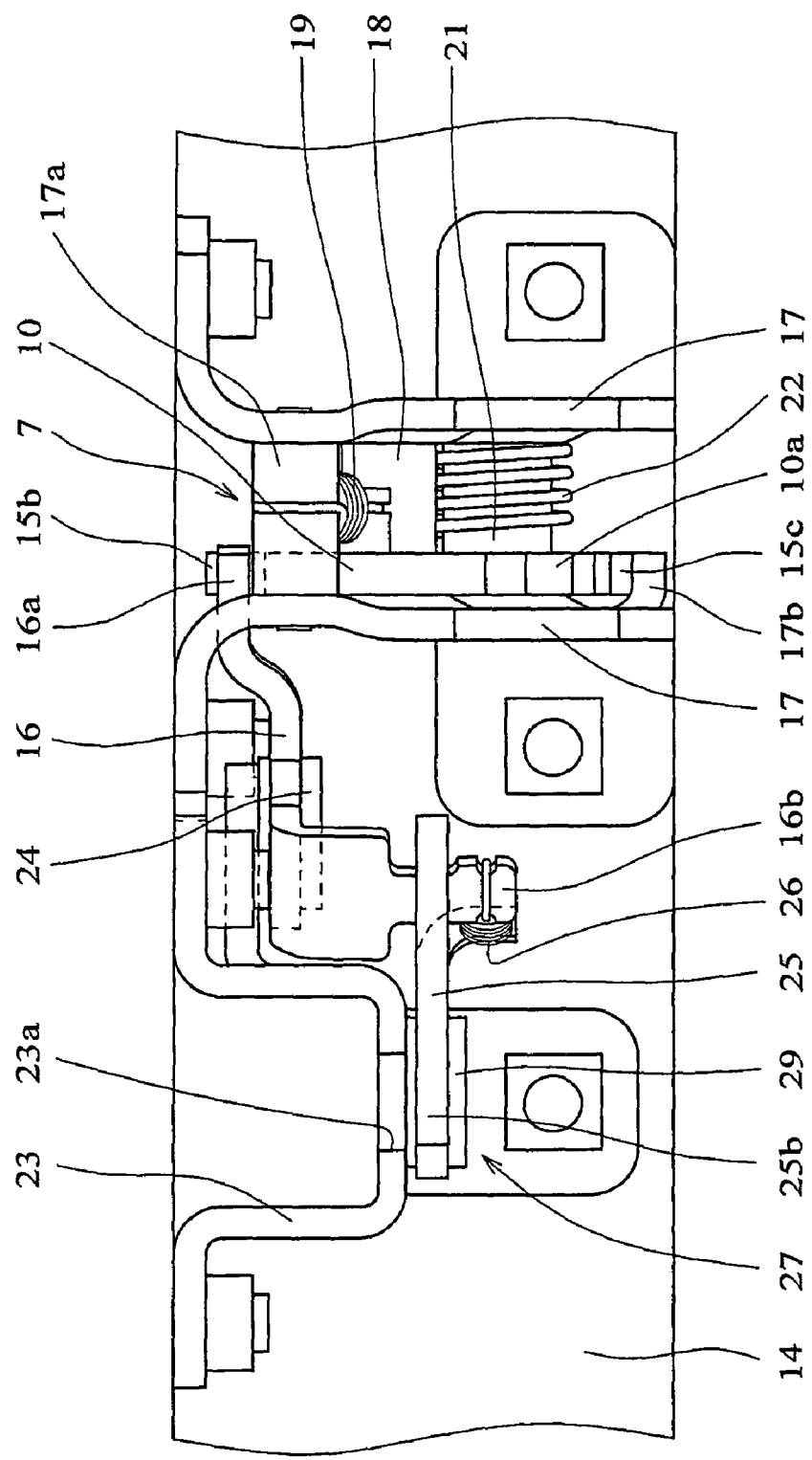
FIG. 8 is a plan view showing a locking device and a second locking device.

An elastic rubber body 20 is fixed to the mounting bracket 13 on which the opening-side lock receiver 9 is mounted (see FIGS. 4 and 7). The elastic rubber body 20 comes into contact in a pressing manner with an upper end portion of the top window frame 2a of the front window 2 when the front window 2 is made to be positioned at the opened position. By an elasticity derived from the elastic rubber body 20, the locked front window 2 at the opened position can be prevented from being jolted even if a chassis vibration or the like occurs.

The holding member 15 is swingably supported around a spindle 21 between the pair of right and left first brackets 17. On swinging leading end sides of the holding member 15, formed are the latch protruding piece 15a that is latchable with the latch receiving part 10b of the lock body 10; and a lever contact portion 15b to be pressed by a holding member pressing part 16a of the release operation lever 16, which will be described hereinafter. At an opposite side of the lever contact portion 15b across the spindle 21, formed is a stopper 15c that is contactable with a stopper receiving portion 17b that is formed to one of the first brackets 17.

A second spring 22 is provided between the holding member 15 and another first bracket 17. The holding member 15, which is wound around the spindle 21, is urged by a second spring 22 in a direction in which the latch protruding piece 15a is latched with the latch receiving part 10b of the lock body 10 (i.e., an anti-clockwise direction in FIGS. 11 and 12). A latching state between the latch protruding piece 15a of the holding member 15 and the latch receiving part 10b of the lock body 10 varies according to the above-mentioned various postures of the lock body 10. This will be described hereinafter with reference to FIGS. 11X, 11Y, 12X and 12Y.

When the lock body 10 is in the neutral posture, the holding member 15 is in a neutral posture such that a leading end side of the latch protruding piece 15a is in contact with a leading end side of the latch receiving part 10b of the lock body 10 as indicated by the solid lines in FIGS. 11X and 12X. The holding member 15 in the neutral posture allows the lock body 10 to swing into the closing-side or opening-side locking posture when the closing-side or opening-side lock receiver 8 or 9 is engaged with the engagement groove 10a of the lock body 10. The holding member 15 in the neutral posture also stably holds the lock body 10 that is maintained in the neutral posture by the first spring 19 such that the lock body 10 is not displaced from the neutral posture when the closing-side or opening-side lock receiver 8 or 9 is not engaged with the engagement groove 10a of the lock body 10.

When the front window 2 is positioned toward the closed position, the closing-side lock receiver 8 is engaged with the engagement groove 10a of the lock body 10 in the neutral posture as mentioned above. Then, the lock body 10 swings clockwise into the closing-side locking posture, which causes the leading end side of the latch receiving part 10b of the lock body 10 to be disengaged from the leading end side of the latch protruding piece 15a of the holding member 15. In doing so, the holding member 15 is caused to swing counterclockwise under an urging force by the second spring 22 into a holding posture as indicated by the solid line in FIG. 11Y (also indicated by the alternate long and two short dashed line in FIG. 11X). The holding member 15 in the holding posture prevents the lock body 10 from swinging counterclockwise and back to the neutral posture because the latch protruding piece 15a is latched in a counterclockwise direction of the latch receiving part 10b of the lock body 10 in the closing-side locking posture. Accordingly, the lock body 10 is maintained in the closing-side locking posture.

When the front window 2 is made positioned at the opened position, the opening-side lock receiver 9 is engaged with the engagement groove 10a of the lock body 10 in the neutral posture as mentioned above. The lock body 10 thus swings counterclockwise into the opening-side locking posture, which causes the leading end side of the latch receiving part 10b of the lock body 10 to be disengaged from the leading end side of the latch protruding piece 15a of the holding member 15. In doing so, the holding member 15 is caused to swing counterclockwise under an urging force by the second spring 22 into a holding posture as indicated by the solid line in FIG. 12Y (also indicated by the alternate long and two short dashed line in FIG. 12X). The holding member 15 in the holding posture prevents the lock body 10 from swinging clockwise and back to the neutral posture because the latch protruding piece 15a is latched in a clockwise direction of the latch receiving part 10b of the lock body 10 in the opening-side locking posture. Accordingly, the lock body 10 is maintained in the opening-side locking posture.

The holding member 15 maintains the lock body 10 in the closing-side or opening-side locking posture when the front window 2 is positioned at the closed or opened position. The holding of the lock body 10 by the holding member 15 is releasable based on an operation that sets the release operation lever 16 positioned at a release position when the front window 2 in the closed position is opened or in the opened position is closed, which will further be described below.

A second bracket 23 is fixed to the case 14, and the release operation lever 16 is swingably supported on the second bracket 23 via a spindle 24. The release operation lever 16 includes the holding member pressing part 16a that presses the lever contact portion 15b of the holding member 15; a second lock body engagement part 16b (which is an example of the second lock body operative portion of the present disclosure) that is engageable with an elongated hole 25a that is formed in a second lock body 25, which will be described hereinafter; and an operation portion 16c that protrudes downward from the case 14 so as to be operated by an operator.

Figure 9:
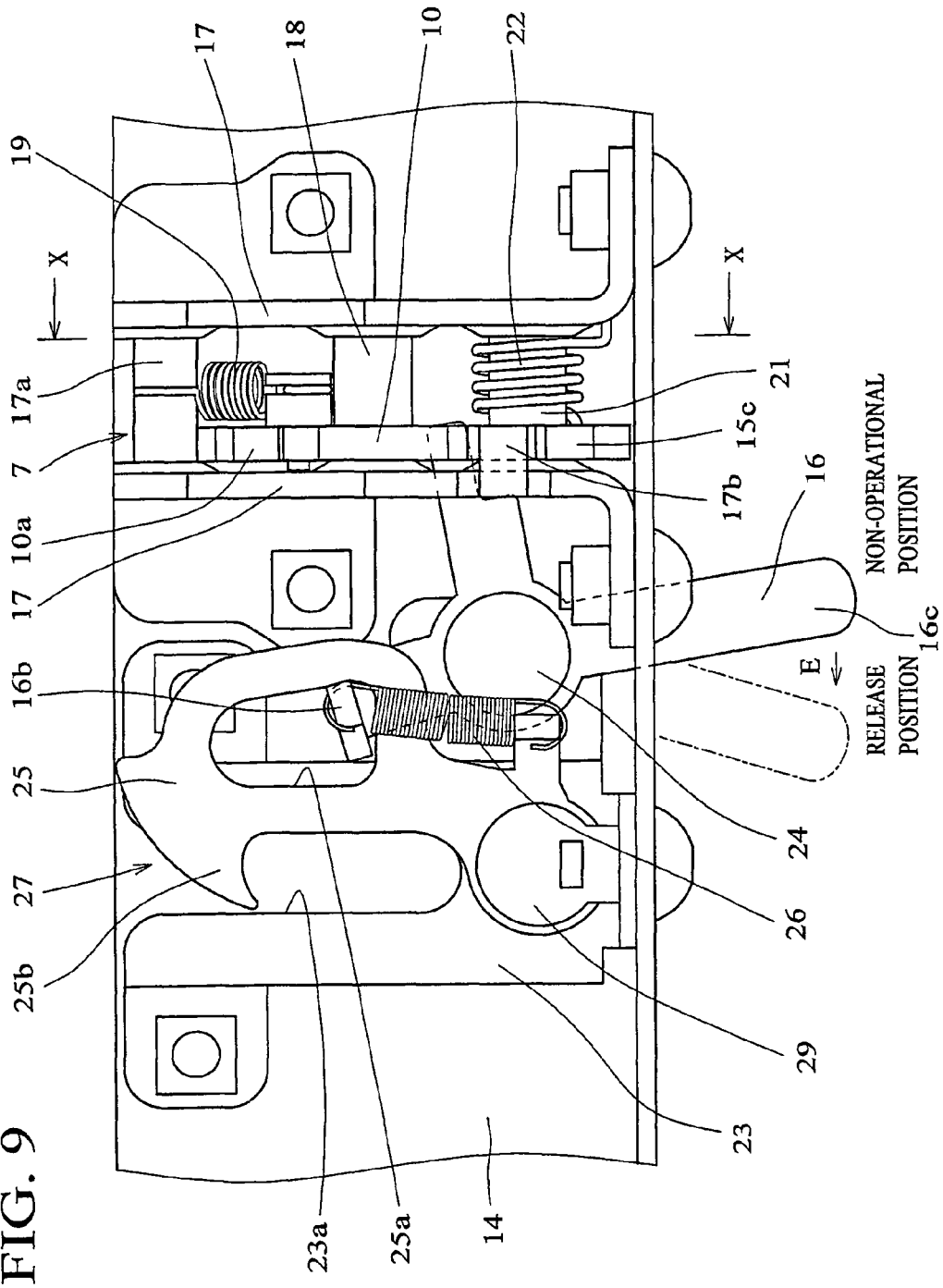
FIG. 9 is a front view showing the locking device and the second locking device.

Further, the release operation lever 16 is urged by a third spring 26 that is provided between the second lock body engagement part 16b and the second lock body 25 such that the operation portion 16c is positioned at a non-operational position as indicated by a solid line in FIG. 9. The release operation lever 16 also swings clockwise around the spindle 24 when the operation portion 16c is operated by the operator in a direction as indicated by an arrow E in FIG. 9 to be positioned at a release position as indicated by an alternate long and short dashed line in FIG. 9. When the operation portion 16c is positioned at the non-operational position, the holding member pressing part 16a of the release operation lever 16 is separated from the lever contact portion 15b of the holding member 15 in the neutral or holding posture so as not to interfere with the holding member 15 as indicated by the solid lines in FIGS. 11X, 11Y, 12X and 12Y. When the operation portion 16c is positioned to the release position from the non-operational position by the operator, the release operation lever 16 swings clockwise, thereby enabling the holding member pressing part 16a to move in a direction as indicated by an arrow F in FIGS. 11Y and 12Y. The holding member pressing part 16a in motion in the arrow F direction presses the lever contact portion 15b of the holding member 15 in the holding posture, which causes the holding member 15 to swing clockwise. Accordingly, the holding member 15 swings into a releasing posture as indicated by the alternate long and two short dashed lines in FIGS. 11Y and 12Y where the latching is released between the latch protruding piece 15a of the holding member 15 and the latch receiving part 10b of the lock body 10. The holding of the lock body 10 in the closing-side or opening-side locking posture by the holding member 15 is thus releasable. In addition, the holding member 15 cannot swing clockwise over the releasing posture because the stopper 15c of the holding member 15 comes into contact with the stopper receiving portion 17b of one of the first brackets 17.

Figure 11Y:
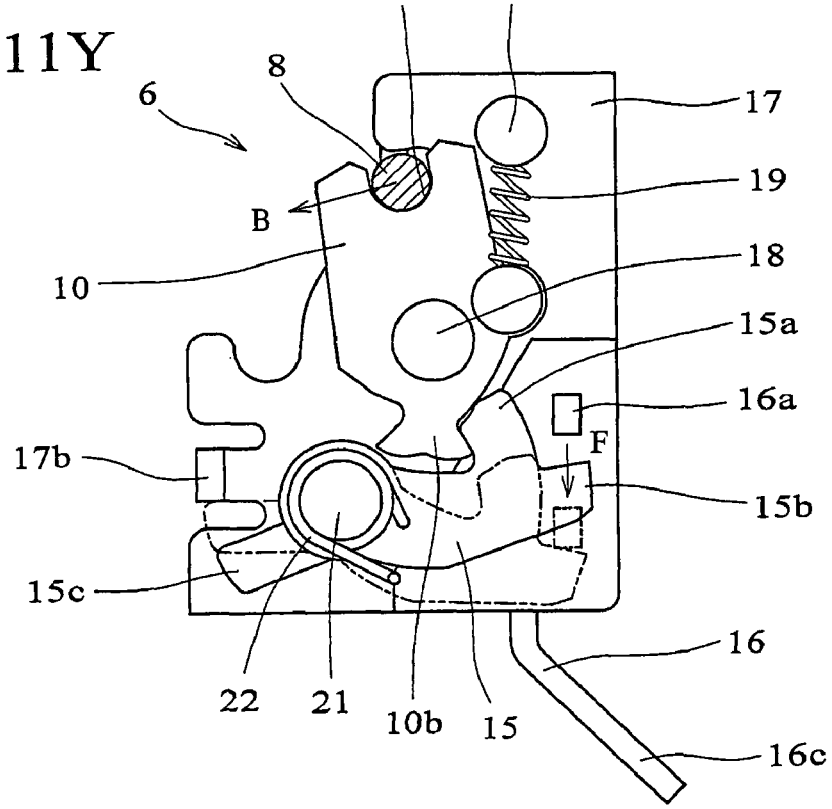
Figure 12Y:
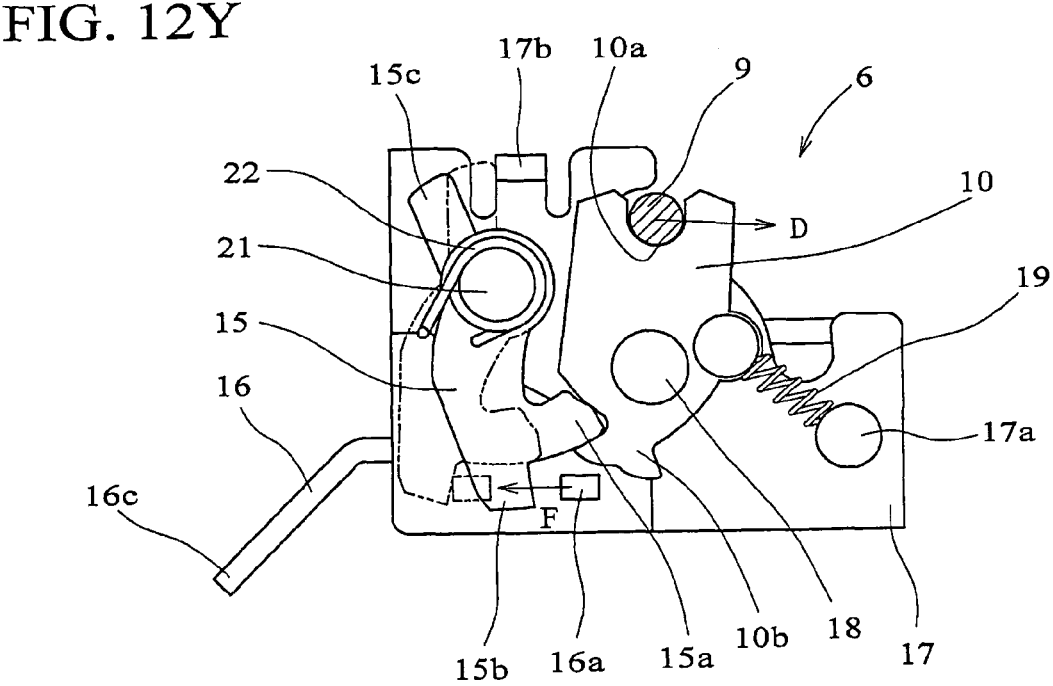

The holding member 15 swings into the releasing posture and releases the holding of the lock body 10 in the closing-side or opening-side locking posture when the operation portion 16c of the release operation lever 16 is made positioned at the release position to open the front window 2 in the closed position or close the front window 2 in the opened position. When the front window 2 is made to move toward an opened or closed side, the closing-side or opening-side lock receiver 8 or 9 that is engaged with the engagement groove 10a relatively moves in the direction of the arrow B as shown in FIG. 11Y or the arrow D as shown in FIG. 12Y with respect to the front window 2. This causes the lock body 10 to return to the neutral posture from the closing-side or opening-side locking posture. Because the lock body 10 in the neutral posture allows the closing-side and opening-side lock receivers 8 and 9 to be disengaged from the engagement groove 10a, a further movement of the front window 2 to the opened or closed side causes the closing-side or opening-side lock receiver 8 or 9 to be out of the engagement groove 10a of the lock body 10 in the neutral posture. Accordingly, the engagement is releasable between the lock body 10 and the closing-side or opening-side lock receiver 8 or 9.

In order to close the front window 2 at the opened position, when the holding of the lock body 10 in the opening-side locking posture by the holding member 15 is released based on an operation of the release operation lever 16, the front window 2 moves automatically toward a closed side under an elasticity of the rubber body 20. This enables the lock body 10 to automatically return to a neutral posture from the opening-side locking posture.

A second locking device 27 is provided for a double-lock of the front window 2 at the opened position independently from the locking device 6. The second locking device 27 includes the second lock body 25 that is provided at the front window 2 side; and a second opening-side lock receiver 28 that is provided at the cab 1 side.

The second opening-side lock receiver 28 has a U-shape that protrudes downward and is fixed to the mounting bracket 13 so as to lie side-by-side with respect to the opening-side lock receiver 9 of the locking device 6.

Housed in the case 14 as is the case with the lock body 10 of the locking device 6, the second lock body 25 is supported swingably around a spindle 29 on the second bracket 23 that is fixed to the case 14. At a swinging leading end side of the second lock body 25, a hook portion 25b is formed to be latchable with the second opening-side lock receiver 28. The second lock body 25 is also formed with the elongated hole 25a with which the second lock body engagement part 16b of the release operation lever 16 is movably engaged. Between the second lock body engagement part 16b of the release operation lever 16 and the second lock body 25, provided is the third spring 26 that urges the release operation lever 16 to be positioned at the non-operational position as mentioned above. The second lock body 25 is also urged by the third spring 26 so as to be in a locking posture as shown in FIGS. 13X and 14X.

A fitting groove 23a is formed to the second bracket 23. The second opening-side lock receiver 28 is fit into the fitting groove 23a when the front window 2 is made positioned at the opened position. The hook portion 25b of the second lock body 25 in the locking posture, as shown in FIGS. 13 and 14, overlaps a relative movement path G of the second opening-side lock receiver 28 that is in and out of the fitting groove 23a.

Figure 13X:
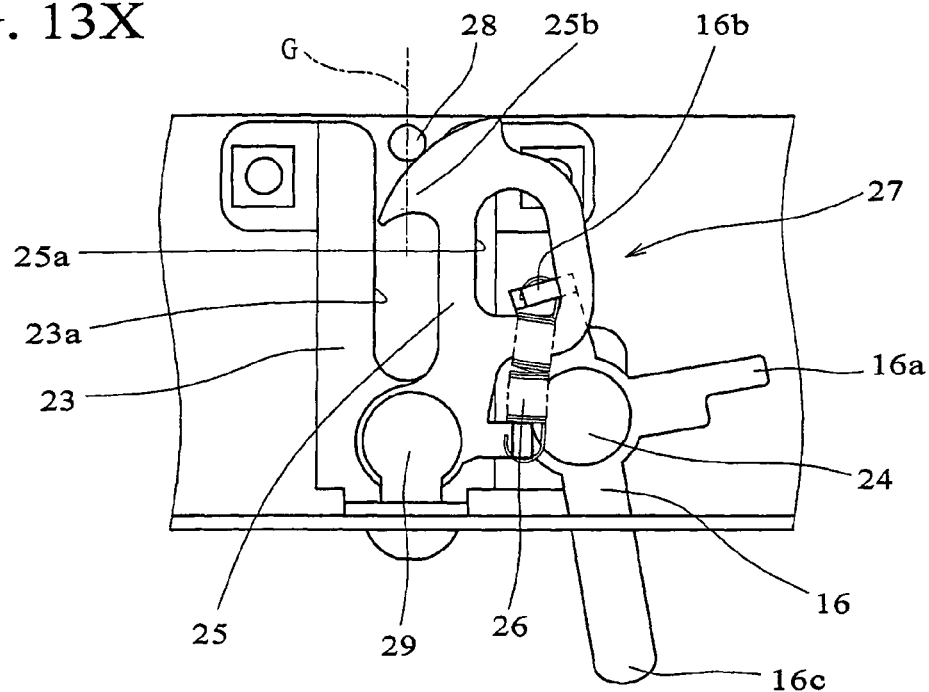
FIGS. 13X and 13Y show an operation of the second locking device.
Figure 13Y:
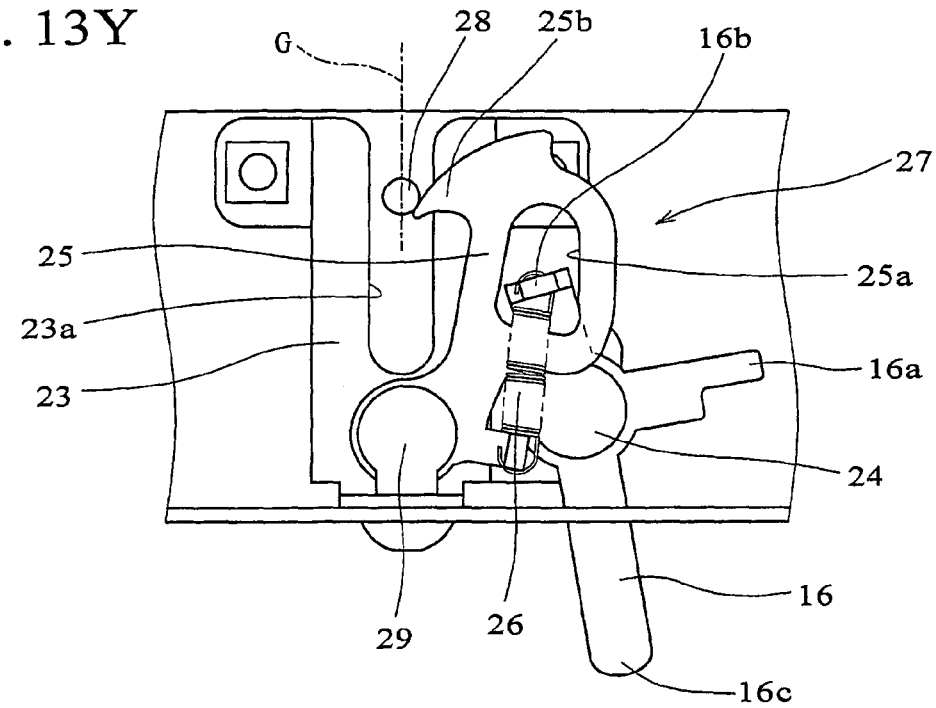
Figure 14X:
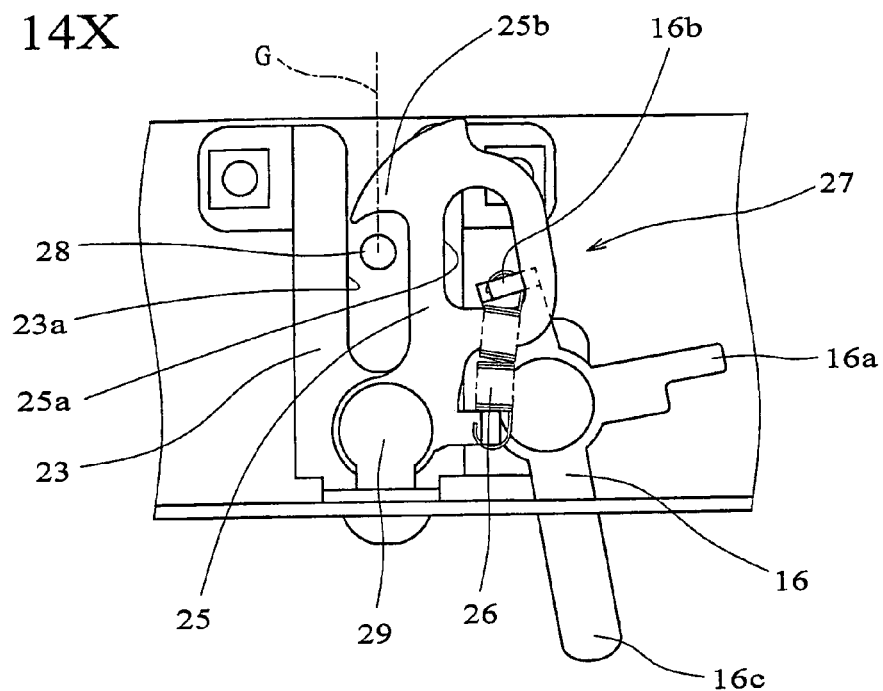
FIGS. 14X and 14Y show another operation of the second locking device.
Figure 14Y:
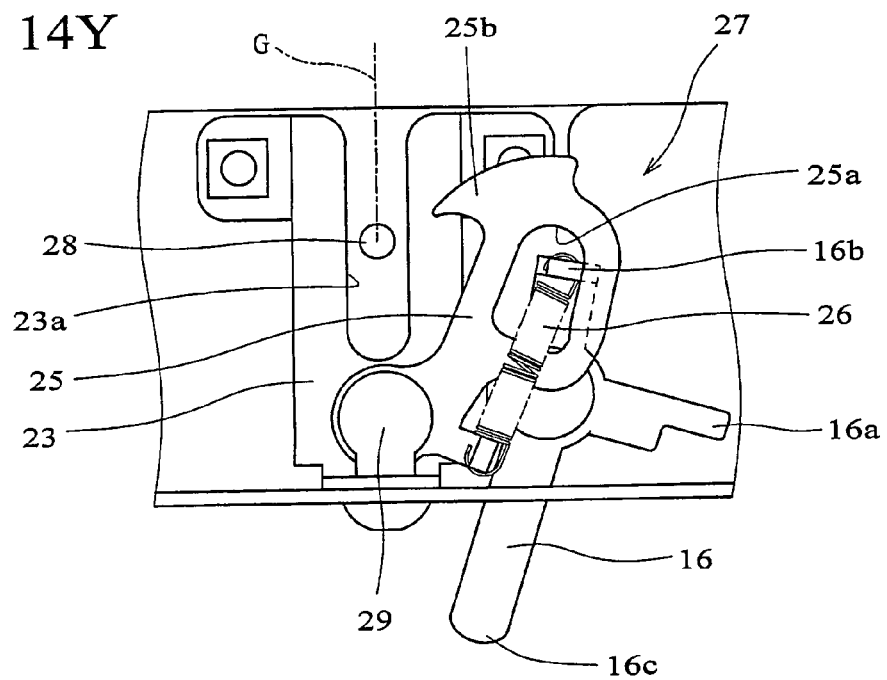

At a position where the front window 2 is about to reach to the opened position, the second opening-side lock receiver 28 in a middle of fitting into the fitting groove 23a abuts against a back side of the hook portion 25b of the second lock body 25 in the locking posture, as shown in FIG. 13X. Then, the second lock body 25 is pressed against the second opening-side lock receiver 28 to withdraw and swing clockwise, as shown in FIG. 13Y, and the second opening-side lock receiver 28 is allowed to fit into the fitting groove 23a. When the front window 2 is moved further to the opened position, the second opening-side lock receiver 28 is fit into the fitting groove 23a, and the second lock body 25 returns to the locking posture under an urging force of the third spring 26, as shown in FIG. 14X. The second lock body 25 in the locking posture prevents the second opening-side lock receiver 28 from being out from the fitting groove 23a because the hook portion 25b is latched with the second opening-side lock receiver 28 even if the front window 2 is tried to move toward a closed side. Accordingly, the front window 2 is locked in the opened position.

The front window 2 at the opened position is double-locked by the locking device 6 and the second locking device 27. Based on an operation that positions the release operation lever 16 at a release position, the locking of the second locking device 27 can be released simultaneously when the locking of the locking device 6 is released.

The release operation lever 16 includes the second lock body engagement part 16*b* that is movably engaged with the elongated hole 25*a* of the second lock body 25, as mentioned above. When the release operation lever 16 is at a non-operational position, the second lock body engagement part 16*b* is positioned at a lower part of the elongated hole 25*a* of the second lock body 25 in the locking posture, as shown in FIGS. 13X and 14X. When the operator positions the operation portion 16*c* at a release position, the second lock body engagement part 16*b* moves upward within the elongated hole 25*a* and presses the second lock body 25. This causes the second lock body 25 to swing clockwise around the spindle 29 into the releasing posture so as not to interfere with the second opening-side lock receiver 28 that is in and out of the fitting groove 23*a*, as shown in FIG. 14 Y. In this state, when the front window 2 is moved toward a closed side, the second opening-side lock receiver 28 is out of the fitting groove 23*a*. Accordingly, the locked front window 2 at the opened position by the second locking device 27 is released.

By positioning the release operation lever 16 to the release position, the second lock body 25 changes into the releasing posture to allow the second opening-side lock receiver 28 to be out of the fitting groove 23*a*, as mentioned above. In this case, it is necessary to keep the release operation lever 16 positioned at the release position while the second opening-side lock receiver 28 is being out of the fitting groove 23*a* because the second locking device 27 cannot be unlocked when the release operation lever 16 is unintentionally touched by the operator. Accordingly, it is designed to prevent an unintentional release of the locked front window 2 at the opened position.

In the above-arranged present embodiment, the locking device 6, which locks the front window 2 at each of the closed and opened positions, includes the locking mechanism 7 provided at the front window 2 side; and the closing-side and opening-side lock receivers 8 and 9 provided at the cab 1 side. The locking mechanism 7 includes the lock body 10; the holding member 15; and the release operation lever 16. The lock body 10, which includes the engagement groove 10*a* that is engageable with the closing-side lock receiver 8 or the opening-side lock receiver 9, is variable among the neutral posture in which the closing-side and opening-side lock receivers 8 and 9 are allowed to be engaged with or disengaged from the engagement groove 10*a*; the closing-side locking posture in which the closing-side lock receiver 8 that is engaged with the engagement groove 10*a* is restricted from being disengaged from the engagement groove 10*a*; and the opening-side locking posture in which the opening-side lock receiver 9 that is engaged with the engagement groove 10*a* is restricted from being disengaged from the engagement groove 10*a*. The lock body 10 changes into the closing-side or opening-side locking posture from the neutral posture so as to lock the front window 2 at the closed or opened position because the engagement groove 10*a* is engaged with the closing-side or opening-side lock receiver 8 or 9 when the front window 2 is made positioned at the closed or opened position. The closing-side and opening-side locking postures of the lock body 10 are maintained by the holding member 15 that changes into the holding posture from the neutral posture according to the variation in the lock body 10. The holding of the lock body 10 in the closing-side or opening-side locking posture by the holding member 15 is releasable when the release operation lever 16 is operated to be positioned at the release position because the holding member pressing part 16*a* of the release operation lever 16 presses the lever contact portion 15*b* of the holding member 15 such that the holding member 15 changes into the neutral posture from the holding posture.

It is unnecessary to mount the components of the locking mechanism 7 such as the lock body 10 and the holding member 15 to both closed and opened position sides, because the locking mechanism 7 that is provided to the front window 2 can be used to lock the front window 2 at not only the closed position but also the opened position. Accordingly, a reduced number of parts and a lower cost are achieved. A smaller size is also actualized with respect to the entire locking device 6. Further, the lock body 10 that is maintained in the closing-side or opening-side locking posture by the holding member 15 is releasable by operating the release operation lever 16 in order to release the lock with respect to the front window 2 at the closed or opened position. The release operation lever 16 works directly to the holding member 15 because both of the release operation lever 16 and the holding member 15 are provided at the front window 2 side. It is unnecessary to provide any additional members in order to connect the release operation lever 16 and the holding member 15. Accordingly, the reduced number of parts is maintained. Better operability is also provided to the release operation lever 16.

Further in the present embodiment, the second locking device 27 is provided for the double-lock of the front window 2 at the opened position. An accidental closure of the front window 2 can be avoided even if the locking device 6 is unlocked at the opened position. The second lock body 25 of the second locking device 27, which is provided to the front window 2 as is the case with the locking mechanism 7 of the locking device 6, is variable between the locking posture in which the second lock body 25 is latched with the second opening-side lock receiver 28 at the cab 1 side; and the releasing posture in which the second lock body 25 is unlatched with the second opening-side lock receiver 28 at the cab 1 side. The front window 2 is locked at the opened position when the second lock body 25 in the locking posture is latched with the second opening-side lock receiver 28. The locked front window 2 is released when the second lock body 25 in the locking posture changes into the releasing posture. The release operation lever 16, which releases the locking of the locking device 6, includes the second lock body engagement part 16*b* that is engageable with the elongated hole 25*a* of the second lock body 25. The second lock body 25 is variable into the releasing posture from the locking posture when the release operation lever 16 is operated to be positioned at the release position.

The locking of the second locking device 27 is also releasable when the release operation lever 16, which releases the locking of the locking device 6, is operated to be positioned at the release position, with a resultant simplified release operation. Further, because the release operation lever 16 works directly to the second lock body 25, no additional members are necessary to connect the release operation lever 16 and the second lock body 25. Accordingly, the reduced number of parts are achieved, and the operability of the release operation lever 16 can also be prevented from being degraded.

The present disclosure is useful for cab front window locking devices that lock the cab front window of a construction machine or the like. This locking mechanism can be used to lock the front window at closed and opened positions. Because an operation of a release operation lever is able to release a locking of the second locking device, a parts number can be reduced and better operability is also given to the release operation lever.

The invention claimed is:

1. A first locking device that locks a cab front window of a cab at a closed position or at an opened position, the front window being movable between the closed position in which the front window closes a window opening part of a front face of the cab and the opened position in which the front window opens the window opening part while being housed into a roof-ceiling portion of the cab, the first locking device comprising:
a locking mechanism that is provided at a side of the front window;
a closing-side lock receiver that is provided at a side of the cab, the closing-side lock receiver being engageable with the locking mechanism of the front window that is positioned at the closed position; and
an opening-side lock receiver that is provided at a side of the cab, the opening-side lock receiver being engageable with the locking mechanism of the front window that is positioned at the opened position;
wherein the locking mechanism comprises:
a lock body that includes an engagement groove with or from which the closing-side lock receiver and the opening-side lock receiver are engaged or disengaged, the lock body being variable by swinging between a neutral posture in which the closing-side lock receiver and the opening-side lock receiver are allowed to be engaged with or disengaged from the engagement groove; a closing-side locking posture in which the closing-side lock receiver that is engaged with the engagement groove is regulated so as not to be disengaged from the engagement groove by swinging around a spindle in a first direction; and an opening-side locking posture in which the opening-side lock receiver that is engaged with the engagement groove is regulated so as not to be disengaged from the engagement groove by swinging around the spindle in a second direction that is different than the first direction;
a holding member that maintains the lock body in the closing-side or opening-side locking posture; and
a release operation lever that acts on the holding member so as to release the closing-side or opening-side locking posture of the lock body that is maintained by the holding member.

2. A locking structure, comprising:
the first locking device according to claim 1; and
a second locking device that double-locks the front window at the opened position, wherein the second locking device comprises:
a second lock body that is provided at the front window side; and
a second opening-side lock receiver that is provided at the cab side, the second opening-side lock receiver being latchable with the second lock body of the front window that is positioned at the opened position, wherein:
the second lock body is variable between a locking posture in which the second lock body is latched with the second opening-side lock receiver; or a releasing posture in which the second lock body is not latched with the second opening-side lock receiver, and
the release operation lever of the first locking device acts on the second lock body of the second locking device such that the second lock body changes into the releasing posture from the locking posture.

3. The locking device according to claim 1, wherein the closing-side and opening-side lock receivers have a U shape.

4. The locking device according to claim 1, wherein:
the holding member includes a latch protruding piece that is latchable with a latch receiving part of the lock body, and a lever contact portion to be pressed by a holding member pressing part of the release operation lever,
when the lock body is in the neutral posture, a leading end side of the latch protruding piece of the holding member is in contact with a leading end side of the latch receiving part of the lock body, and
when the lock body is moved from the neutral posture to the closing-side or opening-side locking posture, the leading end side of the latch protruding piece is disengaged from the leading end side of the latch receiving part, and the holding member is moved to a holding posture such that the latch protruding piece is latched with the latch receiving part.

5. The locking structure according to claim 2, wherein the release operation lever of the first locking device includes a holding member pressing part that presses a lever contact portion of the holding member; a second lock body engagement part that is engageable with the second lock body of the second locking device, and an operation portion that is operated by an operator.

6. The locking structure according to claim 2, wherein the closing-side and opening-side lock receivers of the first locking device and the second opening-side lock receiver of the second locking device have a U shape.

7. The locking structure according to claim 2, wherein:
the second lock body includes a hook portion formed to be latched with the second opening-side lock receiver, and an elongated hole with which a second lock body engagement part of the release operation lever of the first locking device is movably engaged, and
the hook portion is latched with the second opening-side lock receiver at a locking posture in which the second lock body is latched with the second opening-side lock receiver.

8. A cab comprising:
a window opening part at a front face of the cab;
a cab front window being movable between a closed position in which the front window closes the window opening part and an opened position in which the front window opens the window opening part while being housed into a roof-ceiling portion of the cab; and
a first locking device comprising:
a locking mechanism that is provided at a side of the front window;
a closing-side lock receiver that is provided at a side of the cab, the closing-side lock receiver being engageable with the locking mechanism of the front window that is positioned at the closed position; and
an opening-side lock receiver that is provided at a side of the cab, the opening-side lock receiver being engageable with the locking mechanism of the front window that is positioned at the opened position;
wherein the locking mechanism comprises:
a lock body that includes an engagement groove with or from which the closing-side lock receiver and the opening-side lock receiver are engaged or disengaged, the lock body being variable by swinging between a neutral posture in which the closing-side lock receiver and the opening-side lock receiver are allowed to be engaged with or disengaged from the engagement groove; a closing-side locking posture in which the closing-side lock receiver that is engaged with the engagement groove is regulated so as not to be disengaged from the engagement groove by swinging around a spindle in a first direction; and an opening-side locking posture in which the opening-side lock receiver that is engaged with the engagement groove is regulated so as not to be disengaged from the engagement groove by swinging around the spindle in a second direction that is different than the first direction;

a holding member that maintains the lock body in the closing-side or opening-side locking posture; and a release operation lever that acts on the holding member so as to release the closing-side or opening-side locking posture of the lock body that is maintained by the holding member.

9. The cab according to claim 8, further comprising a second locking device that double-locks the front window at the opened position, wherein the second locking device comprises:

a second lock body that is provided at the front window side; and a second opening-side lock receiver that is provided at the cab side, the second opening-side lock receiver being latchable with the second lock body of the front window that is positioned at the opened position, wherein:

the second lock body is variable between a locking posture in which the second lock body is latched with the second opening-side lock receiver; or a releasing posture in which the second lock body is not latched with the second opening-side lock receiver, and the release operation lever of the first locking device acts on the second lock body of the second locking device such that the second lock body changes into the releasing posture from the locking posture.

10. The cab according to claim 8, wherein the closing-side and opening-side lock receivers of the first locking device have a U shape.

11. The cab according to claim 8, wherein:

the holding member of the first locking device includes a latch protruding piece that is latchable with a latch receiving part of the lock body, and a lever contact portion to be pressed by a holding member pressing part of the release operation lever, when the lock body is in the neutral posture, a leading end side of the latch protruding piece of the holding member is in contact with a leading end side of the latch receiving part of the lock body, and when the lock body is moved from the neutral posture to the closing-side or opening-side locking posture, the leading end side of the latch protruding piece is disengaged from the leading end side of the latch receiving part, and the holding member is moved to a holding posture such that the latch protruding piece is latched with the latch receiving part.

12. The cab according to claim 9, wherein the release operation lever of the first locking device includes a holding member pressing part that presses a lever contact portion of the holding member; a second lock body engagement part that is engageable with the second lock body of the second locking device, and an operation portion that is operated by an operator.

13. The cab according to claim 9, wherein the closing-side and opening-side lock receivers of the first locking device and the second opening-side lock receiver of the second locking device have a U shape.

14. The cab according to claim 9, wherein:

the second lock body of the second locking device includes a hook portion formed to be latched with the second opening-side lock receiver, and an elongated hole with which a second lock body engagement part of the release operation lever of the first locking device is movably engaged, and the hook portion is latched with the second opening-side lock receiver at a locking posture in which the second lock body is latched with the second opening-side lock receiver.

* * * * *